United States Patent
Buglione et al.

(10) Patent No.: US 6,817,328 B2
(45) Date of Patent: Nov. 16, 2004

(54) BELT DRIVEN ENGINE STARTER MOTOR SYSTEM

(75) Inventors: Arthur J Buglione, Troy, MI (US); Gerald Cilibraise, Livonia, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 10 days.

(21) Appl. No.: 10/241,079

(22) Filed: Sep. 11, 2002

(65) Prior Publication Data

US 2004/0045519 A1 Mar. 11, 2004

(51) Int. Cl.[7] ............................................. F02N 17/00
(52) U.S. Cl. ................................ 123/179.25; 474/109
(58) Field of Search ..................... 123/179.25, 185.5; 192/41, 42, 28, 109, 135, 111, 131, 138

(56) References Cited

U.S. PATENT DOCUMENTS

| | | | |
|---|---|---|---|
| 4,758,208 A | * | 7/1988 | Bartos et al. ............... 474/135 |
| 6,397,808 B1 | * | 6/2002 | Tanaka et al. ......... 123/179.25 |
| 6,609,989 B2 | * | 8/2003 | Bogner et al. ............... 474/134 |
| 2002/0039942 A1 | * | 4/2002 | Liu et al. ..................... 474/133 |
| 2002/0039944 A1 | * | 4/2002 | Ali et al. ..................... 474/135 |
| 2002/0039945 A1 | * | 4/2002 | Ali et al. ..................... 474/135 |
| 2003/0109342 A1 | * | 6/2003 | Oliver et al. ............... 474/134 |

* cited by examiner

*Primary Examiner*—Mahmoud Gimie
*Assistant Examiner*—Arnold Castro
(74) *Attorney, Agent, or Firm*—Ralph E. Smith

(57) ABSTRACT

A belt driven starter motor system used to start an internal combustion engine. The system comprises a starter motor having a rotor and a pulley, a crankshaft pulley, and a belt tensioner, which are connected by a belt. The belt tensioner has a pulley that is movable between a first position and a second position. The tensioner pulley in the first position applies tension to the belt and the pulley in the second position corresponds to a condition wherein there is generally no tension on the belt. The starter motor begins rotation prior to the initial rotation of the crankshaft pulley, whereby the starter motor partially uses rotational energy to rotate the crankshaft pulley, which results in starting the internal combustion engine.

3 Claims, 2 Drawing Sheets

BELT DRIVEN ENGINE STARTER MOTOR SYSTEM

FIELD OF THE INVENTION

The present invention relates to an engine starter motor system and more particularly to a belt driven engine starter for an internal combustion engine.

BACKGROUND OF THE INVENTION

Internal combustion engines are typically started by a dedicated electric starter motor mounted to the engine. In the typical configuration, the starter motor receives a signal from the vehicle operator to start the engine. A gear mounted to a pinion in the electric starter motor advances from the electric starter and meshes with a ring gear attached to the crankshaft of the engine. Once the ring gear and the electric motor gear have meshed, the electric starter motor rotates, thus turning the ring gear attached to the crankshaft. Turning of the ring gear consequently turns the engine and with the engine ignition system energized the engine starts.

Electric starter motors that drive the ring gear of the engine are typically geared in a range from about ten-to-one up to fifteen-to-one. Setting the arithmetic ratio between the starter motor gear teeth and the ring gear teeth attached to the crankshaft to about ten-to-one up to fifteen-to-one accomplishes this. As such, typical electric starter motor systems take generally one second to achieve engine crankshaft rotational speeds of one hundred twenty-five revolutions per minute under warm engine conditions. While a warmer engine may start quicker than a cold engine, a typical electric engine starter that is meshed to a ring gear due to the fixed gear ratio will generally take at least the aforementioned one second to produce an engine speed sufficient to start an internal combustion engine at any anticipated ambient temperature.

Whether or not an engine will start faster, the performance of the engine starter motor is generally the same, even though the performance required from an electric starter motor to start a warm engine is less than what is required to start a cold engine. For example, the electric motor turns the engine between fifty to one hundred twenty-five revolutions per minute and the starting sequence still takes at least one second whether the engine is cold or warm. It is, therefore, desirable to take advantage of the ability to start a warm engine at faster engine speeds and shorter engine starting durations.

It is also desirable to have an electric engine starter that is not otherwise limited to the gear ratio range from ten to one up to fifteen to one as to more easily increase the engine speeds during engine start. It also desirable to have an electric starter motor that is faster, so that faster engine speeds are achievable during the startup sequence and the time required to achieve the faster engine speeds is shorter.

Other typical electric starter motors that are configured with ring gears attempt to achieve faster engine speeds during the start sequence to produce faster engine starting times. These faster systems, however, employ forty-two volt electrical systems over the prevalent and less expensive twelve volt systems. While the forty-two volt system may achieve desired engine starting performance, implementation of a forty-two volt system remains a costly endeavor. Implementing a forty-two volt system solely for the electric starter motor system requires the added complexity of multiple systems running with different voltages in the vehicle. Implementing a vehicle-wide forty-two volt system would result in redesigning and retooling multiple electrical sub-systems in the vehicle just to satisfy the demand for only a forty-two volt engine starter system. It is, therefore, desirable to use a twelve volt electric starter motor as to avoid the costs associated with a forty-two volt alternative.

Shutting down the engine when there is no demand for engine power and restarting the engine when a demand is present is a common scheme to reduce fuel consumption when using an internal combustion engine. It has not, however, been advantageous to do so on a vehicle that only has one power source. For example, a driver in a typical vehicle with an internal combustion engine would face an excessive delay waiting for the engine to restart with a typical electric starter motor meshed to a ring gear. The excessive delay is due to the above mentioned time required to start the engine due to inability to turn the engine faster. It is, therefore, desirable to restart a warm engine without excessive delays so that an engine can be restarted in a single power source vehicle to reduce fuel consumption.

Shutting down the internal combustion engine when there is no demand for engine power and restarting the engine when a demand is present is a common scheme to reduce fuel consumption in a hybrid vehicle when using an electric and internal combustion engine. While methods to restart the internal combustion engine on a hybrid vehicle are common, an electric motor meshed to a ring gear remains the typical simple arrangement to start the engine. While this arrangement suffers from the drawbacks mentioned above for a non-hybrid vehicle, it also has the additional drawback of the typical electric starter motor drawing more energy then is otherwise needed to start a warm engine. The need to conserve energy is inherent to the design paradigm of a hybrid vehicle. As such, it is, therefore, desirable to have an electric starter for a hybrid engine that starts the internal combustion engine faster and uses less energy.

SUMMARY OF THE INVENTION

The present invention is directed to a belt driven starter motor system used, for example, to start an internal combustion engine. The system comprises a starter motor including a rotor and a pulley, a crankshaft pulley, and a belt tensioner, which are connected by a drive belt. The belt tensioner has a movable first pulley and a movable second pulley. At rest, both pulleys apply tension to the drive belt. The starter motor rotor begins rotation prior to the initial rotation of the crankshaft pulley where the first pulley withdraws and the second pulley advances to maintain belt tension. This allows the starter motor rotor to use rotational energy to initiate rotation of the crankshaft pulley and the crankshaft. This facilitates the rapid start of the internal combustion engine.

In another aspect, the present invention is directed to a belt driven starter motor system where a belt tensioner device is absent. The system includes a crankshaft and a pulley and a starter motor having a rotor and a pulley, which are connected by a drive belt. The system also comprises a delay device for delaying rotation of the crankshaft pulley for a predetermined time period or rotational displacement of the starter motor rotor after initiation of the starter motor rotor rotation. This allows build-up of rotational energy in the rotor for use in subsequent rotation of the crankshaft pulley to start the internal combustion engine. Thus, the starter motor rotor begins rotation prior to rotation of the crankshaft pulley, wherein the rotor partially uses rotational energy to rotate the crankshaft pulley to start the internal combustion engine.

The starter motor rotor uses the rotational energy stored as it rotates prior to the time in which the crankshaft pulley begins to rotate. The delay in rotation is achievable by providing slack in the belt that connects the starter motor to the crankshaft pulley, such that the starter motor pulley, attached to the starter motor rotor, rotates to take up the slack on the belt. Once the starter motor has rotated to the point where there is no longer slack in the belt but now tension, the crankshaft pulley begins to move due to the rotational force exerted by the starter motor pulley. The starter motor, however, has begun to rotate before the crankshaft pulley. As such, the electrical energy needed to generate the rotational force to turn the crankshaft pulley is less than what would be needed if the starter motor began to rotate at same time as the crankshaft pulley, due to the fact the starter motor rotor has stored rotational energy.

In one embodiment of the invention, a bi-directional belt tensioner is used to control tension on the belt. The bi-directional belt tensioner has two pulleys, which are interconnected by a spring. As the starter motor rotor begins to rotate, the first pulley begins to back off the belt as the starter motor pulley exerts a force on the belt creating tension. The rotational force generated by the starter motor creates enough tension in the belt to move the first pulley, but not enough to initiate rotation of the crankshaft pulley. Movement of the first pulley consequently provides slack in the belt. Contemporaneously, the starter motor pulley rotates to remove slack in the belt, which ultimately results in maintenance of tension in the belt. The motion of the belt tensioner pulley in concert with rotation of the starter motor pulley allows the starter motor rotor to begin rotation prior to the rotation of the crankshaft pulley.

In another embodiment of the invention the bi-directional tensioner is absent and a delay device is used integral to the starter motor, so that the starter motor rotor is able to spin up before the starter motor pulley engages the belt to subsequently rotate the crankshaft pulley. One such device is a torsion spring integral to the starter motor pulley, whereby the starter motor begins to rotate and apply tension to the spring. Only after enough tension is created in the spring, will the starter motor pulley begin to rotate. As such, the rotor begins to rotate prior to the crankshaft pulley, thus storing rotational energy which is then used to assist in starting the engine. One other such delay device includes a clutch within the starter motor such that rotational speed of the rotor increases to a point in time where the clutch would engage thereby causing the starter motor pulley to engage the belt. At that point the crankshaft pulley would begin to rotate, such that the starter motor rotor would begin to rotate prior to the crankshaft pulley, thus storing rotational energy which is then used to assist in starting the engine. One other such delay device includes a threaded rotor integral to the starter motor. The starter motor rotates such that the threaded rotor spins within the starter motor pulley such that the rotor spins freely as the threads advance within the pulley. Ultimately, the pulley will encounter a stop at the end of the threads, and at that time the pulley begins to rotate with the starter motor. As such, the starter motor rotor is able to rotate prior to the crankshaft pulley, thus storing rotational energy which is then used to assist in starting the engine.

The devices illustrated above are not exhaustive and as such are not intended to limit the scope of the disclosure in any manner. Those skilled in the art will readily appreciate alternative ways to delay rotation of the starter motor rotor prior to engaging the starter motor pulley.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
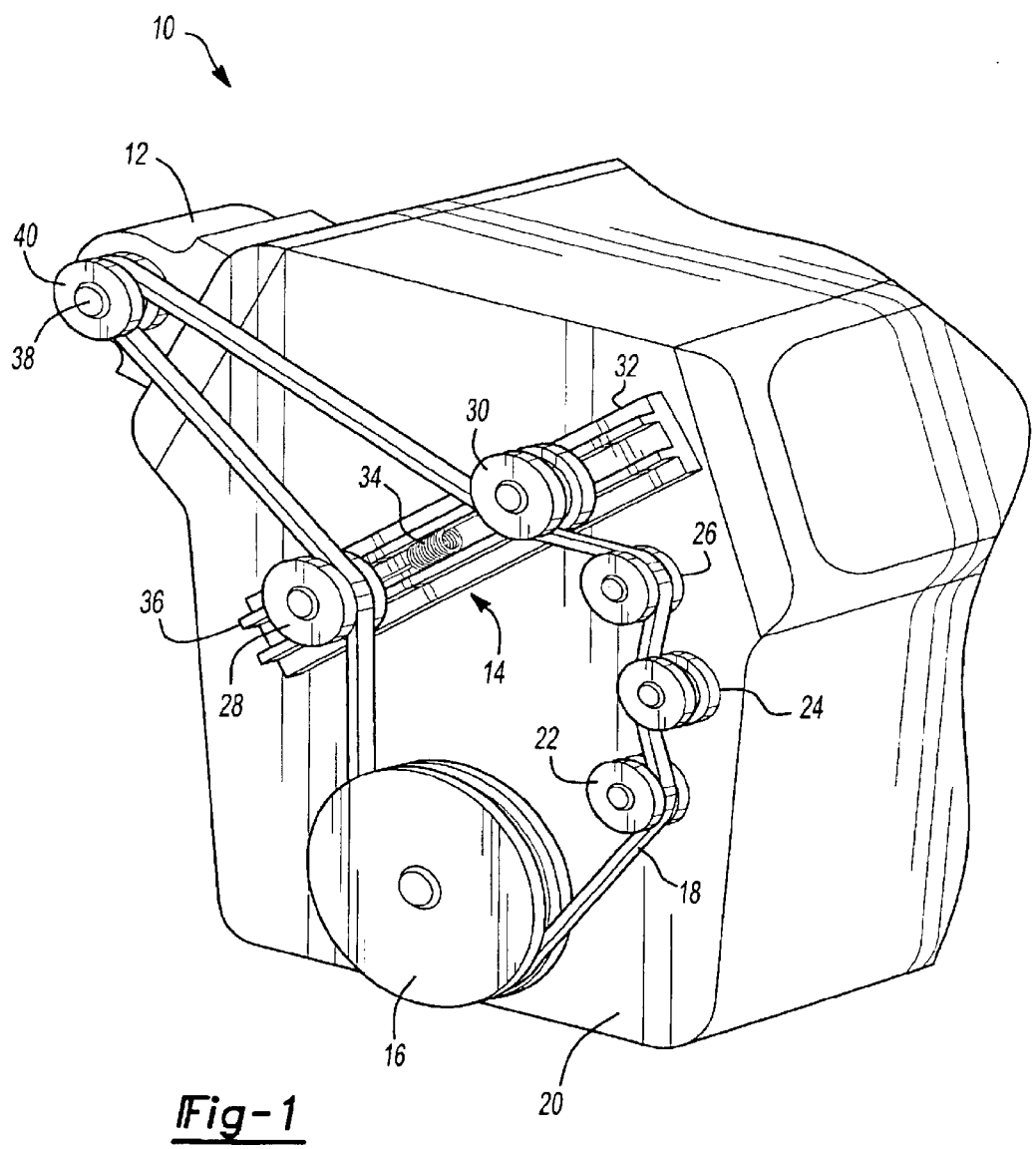
FIG. 1 is an environmental front perspective view of an internal combustion engine constructed in accordance with the teachings of the present invention, with the belt driven engine starter motor system shown in the rest condition.
Figure 2:
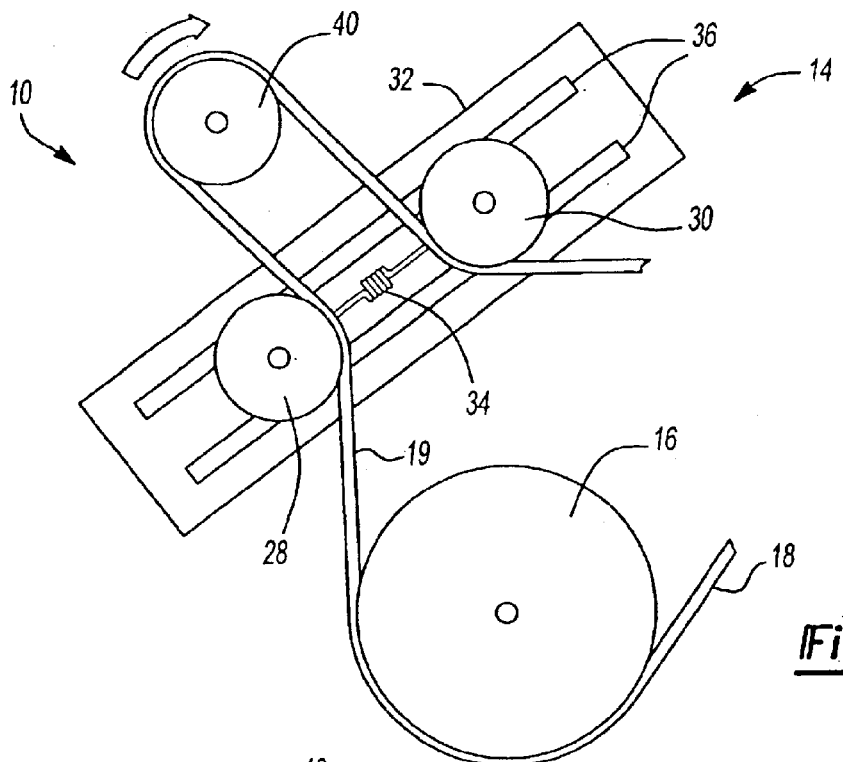
FIG. 2 is a front partial view of the belt driven engine starter motor system of FIG. 1 shown in the rest condition.
Figure 3:
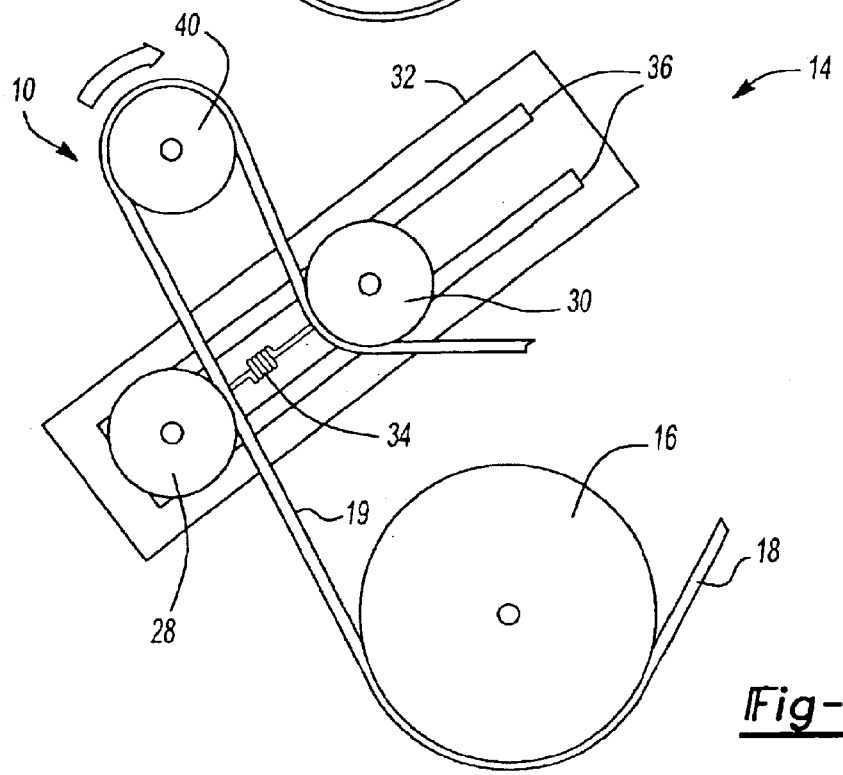
FIG. 3 is a front partial view of the belt driven engine starter motor system of FIG. 1 shown in the condition just before crankshaft motion.

With reference to FIGS. 1, 2, and 3 a belt driven engine starter motor system constructed in accordance with the teachings of the present invention is generally indicated by reference numeral 10. The belt driven engine starter motor system 10 includes a starter motor 12, a bi-directional belt tensioner 14, a crankshaft pulley 16, and a belt 18.

With reference to FIG. 1, the belt driven engine starter motor system 10 is integral to a common internal combustion engine 20. Engine 20 further includes common accessories that are otherwise driven off the same belt 18 as the belt driven engine starter motor system 10. Examples of common accessories are a water pump 22, an air conditioning compressor 26, and a power steering pump 24. While the particular embodiment is illustrated with the crankshaft pulley 16 driving the belt 18 which is linked to the starter motor 12, the bi-directional tensioner 14 and the common accessories, those skilled in the art will appreciate that the belt driven engine starter motor system 10 can use a separate belt, such that the engine 20 can use two or more belts to drive the aforementioned common accessories.

The starter motor 12 includes a rotor 38 and a pulley 40. The starter motor when energized provides rotational energy to spin the rotor 38 that is attached the pulley 40. As such, the pulley 40 will rotate and move the belt 18. The starter motor 12 when not energized serves as an alternator, as it is only spinning due to the rotational force provided by the crankshaft pulley 16 from the engine 20. While starter motor 12 serves as an alternator, it produces a charge to maintain the electrical system of the vehicle.

The crankshaft pulley 16 is a common pulley that is attached to the crankshaft of engine 20. Power produced by the engine 20 is transmitted by the crankshaft to the crankshaft pulley 16 and, as such, the crankshaft pulley transmits rotational energy to starter motor 12 serving as an alternator, and to other common accessories mentioned above.

The bi-directional tensioner 14 includes a first pulley 28 and second pulley 30 enclosed in a fixture 32. The first pulley 28 and the second pulley 30 are attached to one another by a spring 34. The first pulley 28 and the second pulley 30 also are contained on a track 36. The first and second pulleys 28, 30 are free to move on track 36 within the physical boundaries of fixture 32 and are free rotate in either direction. The fixture 32 is mounted to the front of the engine 20.

The bi-directional tensioner 14 is attached to the engine 20 so that the belt 18 travels from the crankshaft pulley 16 to the first pulley 28. From the first pulley 28, belt 18 travels to the starter motor pulley 40 and then to second pulley 30. Belt 18 then travels to the common accessories. From the common accessories 22, 24, 26 the belt 18 returns to the crankshaft pulley 16.

With reference to FIG. 2, the belt driven engine starter motor system 10 is shown in a steady state condition. The first pulley 28 and the second pulley 30 of the bi-directional tensioner 14 are applying tension to the belt 18. The steady state condition of the engine 20 corresponds to the engine in a running or a shutdown condition. When engine 20 is running, the starter motor 20 is serving as an alternator and, as such, is providing electrical energy to the vehicle's electric power system.

With reference to FIG. 3, the belt driven engine starter motor system 10 is shown in the condition that corresponds to the moment just before motion of the crankshaft pulley 16. The first pulley 28 begins to translate away from the second pulley 30 within the fixture 32 along track 36. Translation of the first pulley 28 is due to the rotational force of the starter motor pulley 40 applied to the belt 18. As the starter motor pulley 40 rotates the belt 18 is put into a state of tension.

The increase of tension in the belt 18 is sufficient to overcome the force of spring 34, thus forcing the first pulley 28 to translate away from the second pulley 30. The movement of pulley 28 inhibits force sufficient to initiate rotation of the crankshaft pulley 16. As such the starter motor rotor 38 has begun to rotate but the crankshaft pulley 16 has not. The length of belt 18 between the starter motor pulley 40 and the crankshaft pulley 16 is reduced, and, as such, tension on the belt 18 increases.

The increase in tension of the belt 18 will force the portion 19 of belt 18 between pulleys 40 and 16 into a straightened condition, as shown in FIG. 3, from the deflected condition shown in FIG. 2. When the belt portion 19 is in a straightened condition, the tension in belt 18 is such that the orientation of belt 18 can no longer push the first pulley 28 away from the second pulley 30. At this point, the tension is enough to begin rotation of the crankshaft pulley 16.

Simultaneously, with the motion of the first pulley 28, the second pulley 30 will maintain tension on the belt 18 after it travels from the starter motor pulley 40. The motion of first pulley 28 pulling second pulley 30 via initially attached spring 34 after starter motor rotor 38 begins to rotate maintains tension on belt 18.

With the belt portion 19 now in the straightened condition, the belt driven engine starter motor system 10 appears as shown in FIG. 3 just prior to crankshaft motion. The starter motor rotor 38 continues to rotate increasing the tension on the belt 18. In response to the rotational force exerted by the starter motor 12, the crankshaft pulley 16 begins to rotate. Consequently, rotation of the crankshaft pulley rotates the crankshaft, which results in starting the engine 20.

The starter motor rotor 38 is able to rotate because the first pulley 28 retreats due to the tension in belt 18. The starter pulley 40, however, is not turning the crankshaft pulley 16, because it taking up the additional portion of the belt, due to the movement of the first pulley 28. The starter motor rotor 38, therefore, is accumulating rotational energy prior to the point in time where it must rotate the crankshaft pulley 16. Only when the first pulley 28 has retreated to the position shown in FIG. 3 does the crankshaft pulley 16 begin to rotate, and at that time the starter motor rotor 38 has accumulated rotational energy, so that it can use the stored energy in turning the crankshaft pulley 16 and ultimately starting the engine 20.

In the particular embodiment illustrated, the starter motor rotor 38 is able to rotate for about fifty milliseconds prior to rotating the crankshaft pulley 16. As such, for about fifty milliseconds the rotor 38 is accumulating rotational energy that it can consequently use to assist rotating the crankshaft pulley 16 and starting the engine 20. One skilled in the art will readily appreciate that time delay between rotation of the rotor 38 and the crankshaft pulley 16 can be sized to accommodate different starter motor sizes, different engine sizes and different electrical and engine architecture designs. As such, the fifty millisecond delay serves as an example but does not serve to limit the invention as disclosed.

In the particular example the engine 20 starts in less than about five hundred milliseconds and at an engine speed greater than approximately five hundred revolutions per minute. Further, the starter motor pulley 40, the belt 18, and the crankshaft pulley 16 are sized as to produce a gear ratio of about three to one, such that the geometric ratio between the starter motor pulley 40 and the crankshaft pulley is less than a conventional ratio of a gear-driven starter motor and flywheel, for example, about three to one. As mentioned above, one skilled in the art could alter the start time, the engine speed at start, and the gear ratio to different starter motor sizes, different engine sizes, and different electrical and engine architecture designs. Hence, the five hundred millisecond start time, the five hundred revolutions per minute start speed and the three to one gear ratio serve as examples but do not serve to limit the invention as disclosed.

As used herein, the term "delay device" includes not only the dual pulley mechanism 32 shown in FIGS. 1–3, but additionally includes, without limitation, the following alternative structures. One example of such an alternative structure is a clutch system integral to the starter motor 12, wherein the clutch system allows the starter motor rotor 38 to rotate for a predetermined time prior to tensioning of the drive belt. Once the predetermined time is reached, the clutch system engages and the starter motor pulley 40 will begin to rotate such that tension is exerted on belt 18. Now that the pulley 40 is rotating, the starter motor pulley 40 creates tension on belt 18, so that the crankshaft pulley 16 will begin to rotate consequently starting the engine 20.

Another alternative example of a delay device is a threaded rotor integral to the starter motor 12, wherein the threaded rotor rotates for a predetermined time prior to drive belt tensioning. By sizing the threads appropriately, the threaded rotor rotates within the starter motor pulley 40 until the reaching the end of the threads and thereby engaging the pulley 40 thus engaging the belt 18.

Still another alternative example of a delay device is a torsional spring integral to the starter motor pulley 40, wherein the torsion spring allows the starter motor rotor 38 to rotate for the predetermined time delay. By sizing the spring constant of the torsional spring appropriately, the starter motor rotor 38 can rotate so that the torsion spring compresses to a certain point. Ultimately the torsional spring no longer compresses and engages the starter motor pulley 40 so that it spins and provides tension in belt 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An engine starting system for starting an internal combustion engine comprising:
   a rotor pulley adapted to be coupled to a rotor of a starter motor;
   a crankshaft pulley adapted to be coupled to a crankshaft of the engine;
   a belt rotatably coupling to the rotor pulley and the crankshaft pulley along a belt run; and
   a belt tensioner including a first tension pulley engaging the belt at a first position at a first side of the run between the rotor and crankshaft pulleys, a second tensioner pulley engaging the belt at a second position at a second side of the run opposite the first position, a fixture mounting the first and second tensioner pulleys for translational movement along a track in the fixture, and a spring coupled between the first and second tensioner pulleys and biasing the first and second pulleys against the belt in a steady state condition of the engine;
   wherein, upon initiation of rotation of the belt via the rotor pulley during engine start, belt tension is sufficient to overcome bias of the spring to translate the first end second tensioner pulleys in opposite directions thereby delaying rotation of the crankshaft pulley for a predetermined time after initiation of rotation of the rotor pulley.

2. The engine starting system of claim 1 wherein the first and second tensioner pull ys engage the belt at an outer side of its run and wherein the first and second tensioner pulleys translate away from each other when the belt tension is sufficient to overcome the spring bias.

3. The engine starting system of claim 1 wherein a gear ratio between the rotor pulley end the crankshaft pulley is less than about ten-to-one.

* * * * *